United States Patent
Chen

[11] Patent Number: 5,965,916
[45] Date of Patent: Oct. 12, 1999

[54] THIN-FILM TRANSISTOR STRUCTURE FOR LIQUID CRYSTAL DISPLAY HAVING BLACK MATRIXES CONNECTED TO A GATE LINE

[75] Inventor: Mei-Soong Chen, Taichung, Taiwan

[73] Assignee: Industrial Technology Research Institute, Hsinchu, Taiwan

[21] Appl. No.: 09/002,365

[22] Filed: Jan. 2, 1998

Related U.S. Application Data

[62] Division of application No. 08/785,482, Jan. 17, 1997, Pat. No. 5,879,959.

[51] Int. Cl.$^6$ .................................................. G02F 1/133
[52] U.S. Cl. ........................ 257/347; 257/59; 257/72; 349/43; 349/44; 349/110; 349/137
[58] Field of Search ............................... 257/59, 72, 347; 349/43, 44, 110, 137

[56] References Cited

U.S. PATENT DOCUMENTS 5,510,916  4/1996  Takahashi ..................... 349/43
5,789,761  8/1998  Ihara et al. ..................... 257/59

Primary Examiner—Fetsum Abraham

[57] ABSTRACT

A thin-film transistor structure having a storage-capacitor-on-gate and a black matrix for manufacturing a liquid crystal display is disclosed. A metal layer is deposited and patterned as a black matrix on a glass substrate of the thin-film transistor plate. An insulating layer having a contact hole for contacting the black matrix is formed over the surface of the black matrix and the substrate. An inverted thin-film transistor having a metal gate on the bottom is then fabricated on top of the insulating layer. The thin-film transistor controls an ITO pixel electrode of the liquid crystal display. A gate line including the metal gate of the thin-film transistor is formed over and above a space between two adjacent black matrixes. The gate line is connected to one of the two black matrixes by the contact hole. The other black matrix serves as a light shield element of the ITO pixel electrode. The technique is also applicable to the manufacturing of a non-inverted thin-film transistor having a metal gate on the top.

7 Claims, 9 Drawing Sheets

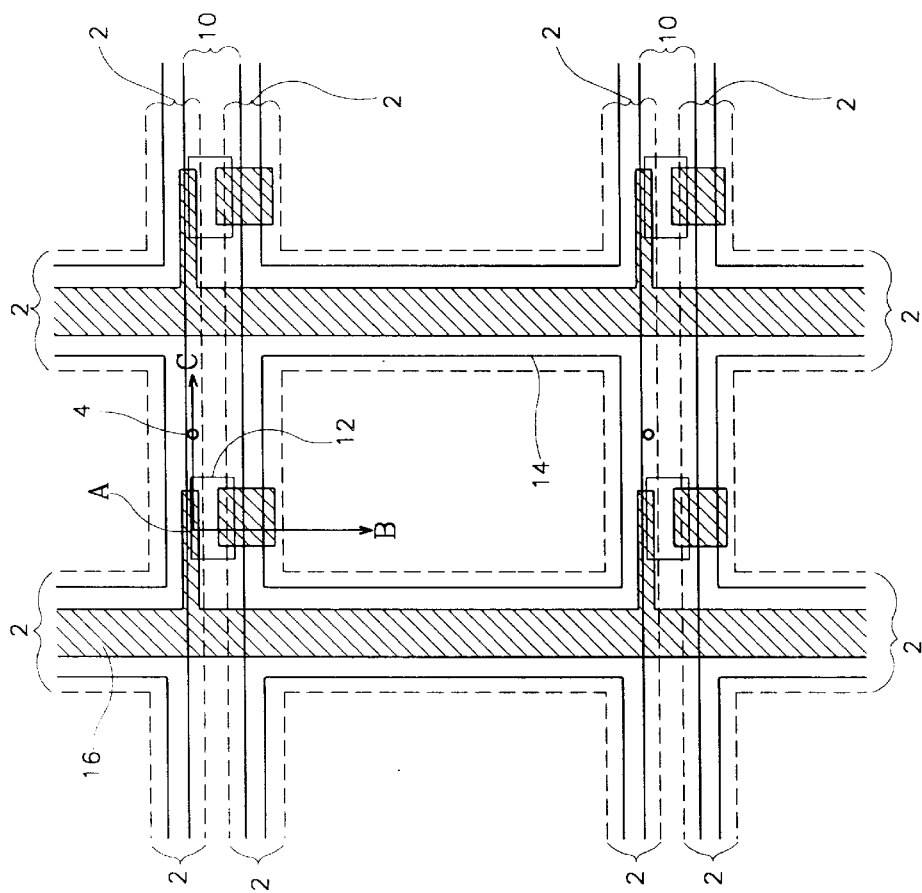

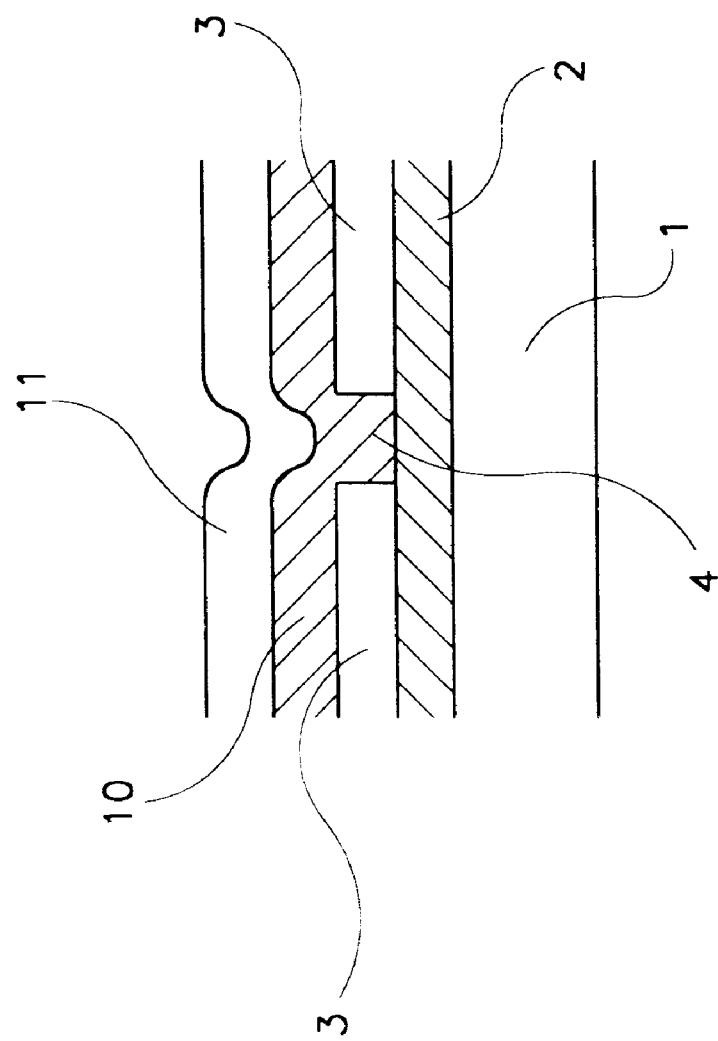

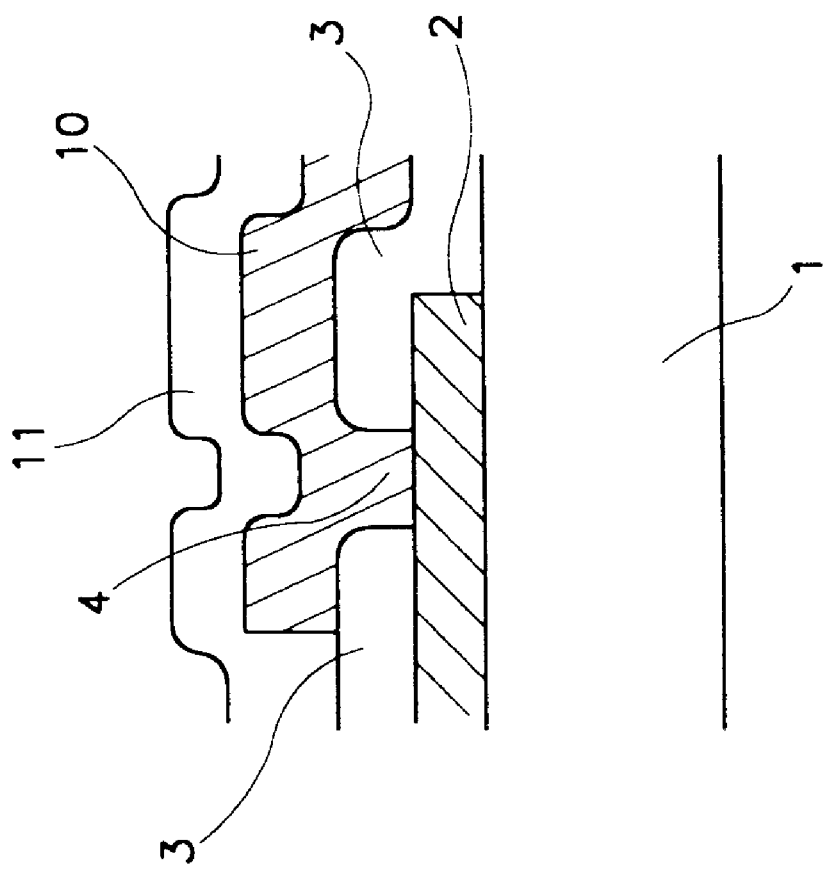

THIN-FILM TRANSISTOR STRUCTURE FOR LIQUID CRYSTAL DISPLAY HAVING BLACK MATRIXES CONNECTED TO A GATE LINE

This is a division of application Ser. No. 08/785,482, filed Jan. 17, 1997 now U.S. Pat. No. 5,879,959.

FIELD OF THE INVENTION

The present invention relates to a liquid crystal display device structure as well as its manufacturing method, and more specifically to the fabrication of a thin-film transistor having a storage capacitor on gate and a black matrix for a liquid crystal display device.

BACKGROUND OF THE INVENTION

Thin-film transistor (TFT) liquid crystal displays (LCDs) have been widely used in areas such as personal notebook computers, portable televisions and video camera monitors. In conventional TFT LCDs, the back-light consumes most of the power. In order to reduce the power consumption of the LCD devices, there are two approaches commonly adopted. One is improving the efficiency of the back-light and the other is increasing the transmission of the light through the liquid crystal cells.

Many different technologies of manufacturing TFT-LCD devices with various structures have been presented to improve the back-light efficiency. U.S. Pat. No. 5,478,611 of T. Hashimoto discloses a glass substrate for LCDs in which unnecessary light of the region other than pixel electrodes can be completely shielded, the TFT optical leak current can be totally suppressed, and the light reflection at the black matrix portion can be almost fully depressed. M. Katayama et. al. presented "A 10.4 in. Diagonal Full-Color TFT-LCD with New Self-aligned a-Si TFTs for OHP System" in pages 243–246 of Conference Record of the 1991 International Display Research Conference. The light degradation of the LCD performance has been suppressed by new self-aligned a-Si TFTs and a new driving method presented in the article.

The light transmission through the liquid crystal cells depends on the aperture ratio of a TFT-LCD device. Much research and development work has been dedicated to obtaining a high aperture ratio for TFT-LCD devices. N. Takahashi presented a structure that achieves a 35% aperture in "A High-Aperture Ratio Pixel Structure for High-Density a-Si TFT Liquid-Crystal Light Valves" of SID 1993 DIGEST, pp. 610–613. "A High-Aperture TFT-LCD with Shield-Electrode Structure" of SID 1993 DIGEST, pp. 739–742 presented by T. Ueda shows that a 58% aperture has been developed. T. Kitazawa et. al. further shows an ultra-high-aperture ratio of 70% by using a shield-electrode structure and a storage-capacitor-on-gate structure in "A 9.5-in. TFT-LCD with an ultra-High-Aperture-Ratio Pixel Structure" of SID 1994 DIGEST, pp. 365–368. An analytical investigation of the aperture ratio on high TFT-array structure has been discussed by K. Suzuki in "High-Aperture TFT Array Structures" of SID 1994 DIGEST, pp. 167–170.

It is clear that there is a strong need in achieving a high aperture ratio for the TFT-LCD devices. Various designs and techniques in forming the black matrix structure in TFT-LCDs have been studied to increase the aperture ratio and improve the back-light efficiency.

SUMMARY OF THE INVENTION

The present invention has been made according to the need of improving back-light efficiency for a TFT-LCD device as described above. A primary object of this invention is to provide a new TFT structure having a storage-capacitor-on-gate and a black matrix integrated together on the TFT plate for the LCD device. Therefore, the invention is to provide a TFT-LCD device having good performance and a high aperture ratio. A second object of this invention is to provide manufacturing methods for fabricating such TFT-LCD structures.

In the present invention, a storage-capacitor-on-gate structure and a black matrix structure are combined together in the TFT-LCD device. A black matrix is formed on top of the glass substrate of the TFT plate. An insulating layer is deposited above the black matrix. A thin-film transistor is then fabricated on the insulating layer for controlling an ITO pixel electrode of the LCD device. An LCD display comprises an array of thin-film transistors and an array of black matrixes on the same plate. A gate line including the gate of a thin-film transistor is formed above and over a space between two adjacent black matrixes. One black matrix serves as a light shield element of the ITO pixel electrode controlled by the transistor. The other black matrix that shields the ITO pixel electrode controlled by the next transistor on the adjacent gate line is connected to the gate line. When the TFT-LCD device is in operation, only the selected gate line is driven. The rest of the gate lines are connected to the common electrode. A storage capacitor is formed by the pixel selected and the black matrix or the gate line under the pixel. Therefore, a structure of storage-capacitor-on-gate is formed for the TFT.

The black matrix of this invention is formed below the thin-film transistor. There is no need to manufacture another black matrix on the color filter plate. The aperture ratio of the TFT-LCD is increased. The invention also decreases the chance of the short between the gate line and the common line because they are manufactured in different layers. In addition, the gate resistance is also reduced because of its parallel connection to the black matrix. It eliminates the need of forming double layers for the gate. The black matrix, which highly reflects the light source, avoids heating of the transistors. Therefore, the TFT-LCDs of this invention are very appropriate for application in projectors where the transistors will be strongly illuminated.

BRIEF DESCRIPTION OF THE DRAWINGS

FIG. 2a shows the plan view of a portion of the LCD devices having a black matrix pattern of the present invention.

DETAILED DESCRIPTION OF THE PREFERRED EMBODIMENT

Figure 1:
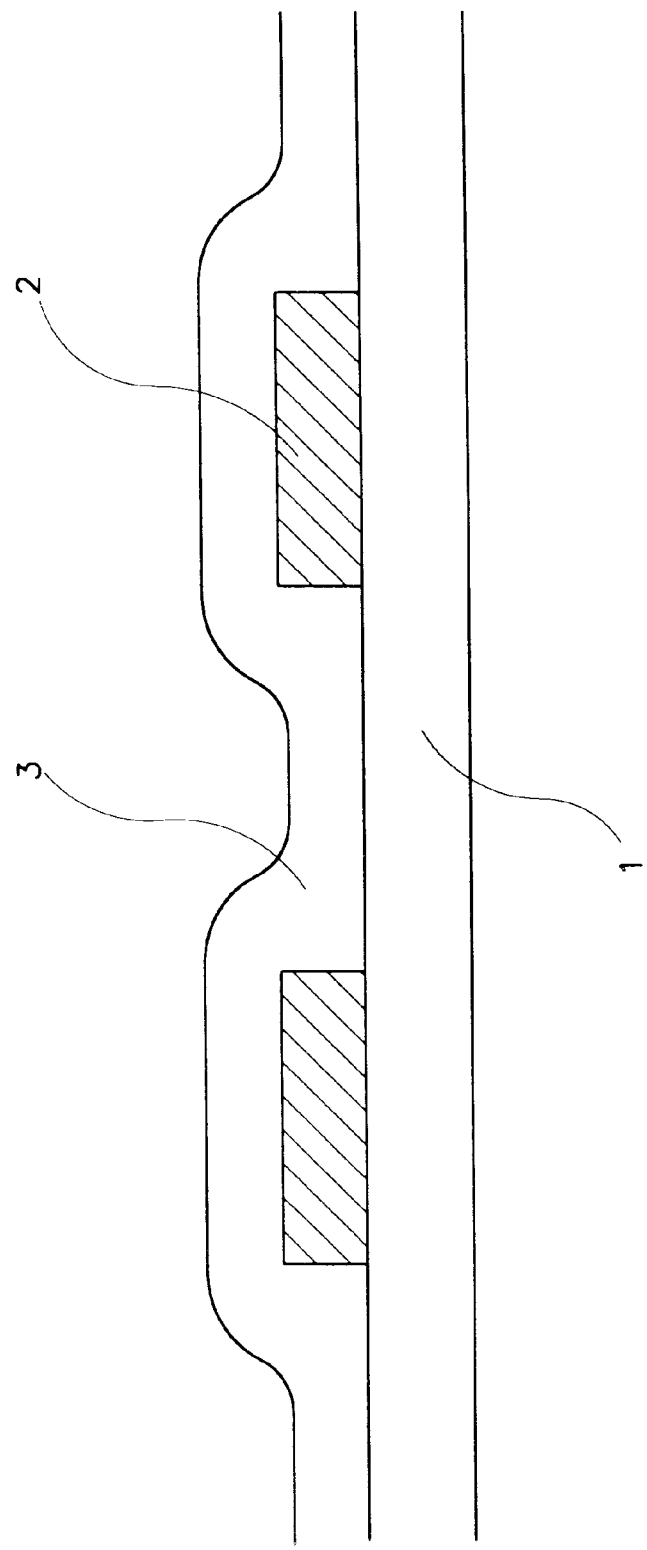
FIG. 1 is a cross-sectional view of the glass substrate, the black matrix layer and the first insulating layer of the TFT plate of the present invention.

With reference to FIG. 1, a glass substrate 1 is used as the starting substrate of the TFT plate of the present invention.

Figure 2B:
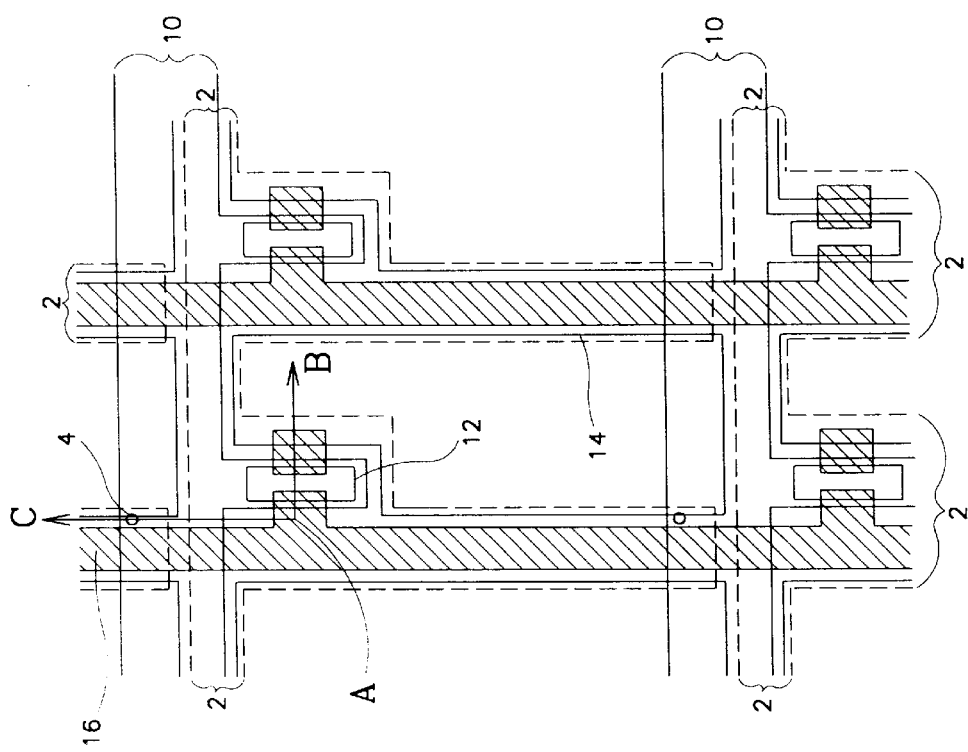
FIG. 2b shows the plan view of a portion of the LCD devices having an alternative black matrix pattern of the present invention.

A first layer of metal is first deposited on the substrate. The preferred material of the metal layer is chromium and its thickness is approximately 1000 to 2000 Angstroms. Similar materials such as molybdenum, aluminum, tungsten, tantalum, or titanium may also be used. The metal layer is patterned and etched by a conventional photolithographic technique and an etching process to form black matrix patterns 2 as shown in FIG. 1. The plan views of the black matrix array are shown in FIGS. 2a and 2b. A first insulating layer 3 is deposited on top of the glass and the black matrix. The insulating layer is typically made of SiNx or SiOx and the thickness is about 500 to 4000 Angstroms.

Two types of patterns can be adopted for the black matrix as shown in FIGS. 2a and 2b. The gate line 10, the data line 16 and the black matrix array 2 are shown in the figures. The plan view of a contact hole 4 that connects the gate line 10 and the black matrix 2 is also shown. The cross sectional views across lines A-B and A-C of FIG. 2a and 2b are shown in FIGS. 3 and 4. As will be explained later, A-B shows a cross section of a thin-film transistor and A-C shows how the black matrix is connected to the gate line of a next thin-film transistor. It should be noted that the black matrix array 2, the gate line 10, the data line 16 and the contact hole 4 of FIG. 2a (or FIG. 2b) correspond to the black matrix pattern, the second metal layer, the third metal layer, and the contact hole of FIG. 3 (or FIG. 4) respectively. Therefore, the same numerals are used in FIG. 3 (or FIG. 4) for the corresponding structures. The width of the black matrix pattern line can be designed according to the requirement of the TFT-LCD device.

The thin-film transistor is fabricated on the surface of the first insulating layer 3. Two different basic structures have been widely used in the industry for manufacturing the thin-film transistors of an LCD device. One uses an inverted thin-film transistor structure that comprises a gate at the bottom of the transistor. The other uses a thin-film transistor structure that comprises a gate on the top of the transistor. Both inverted and non-inverted thin-film transistors can be either staggered or coplanar. For a coplanar structure, the gate and the drain/source are formed on the same side of an island structure. For a staggered structure, they are on a different side. The detailed structure, manufacturing process and materials used in these basic structures have been well known to one skilled in the art. Therefore, only the details that are necessary for understanding the current invention will be described.

Figure 3A:
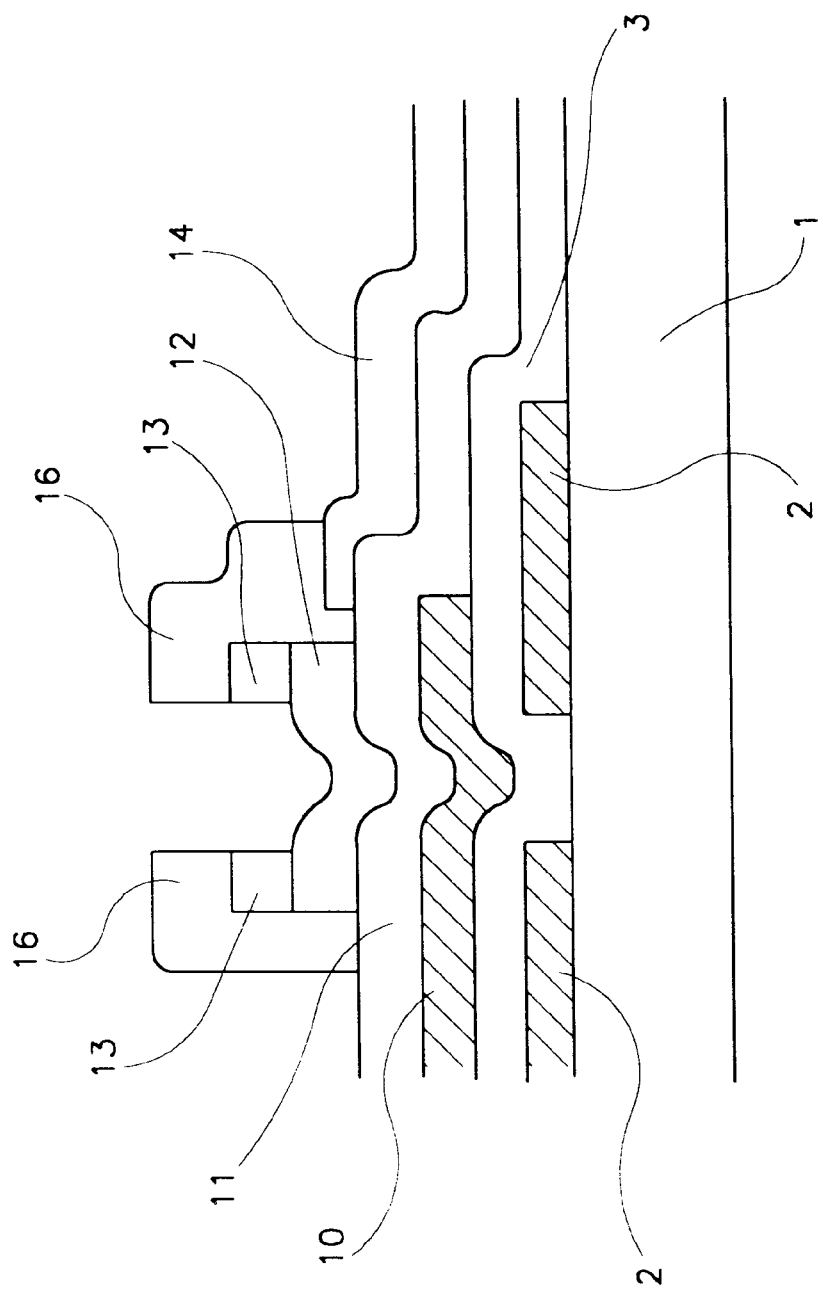
FIG. 3 shows cross-sectional views of FIG. 2a comprising a back-channel-etching type inverted staggered TFT.

FIG. 3a shows a cross sectional view of the present invention along the line A-B of FIG. 2a. The thin-film transistor of this embodiment is a back-channel-etching (BCE) type inverted staggered TFT. FIG. 3b shows the cross sectional view along the line A-C of FIG. 2a. Before fabricating the thin-film transistor, the first insulating layer 3 described above is patterned and etched using conventional techniques to form a contact hole 4 for contacting the black matrix as shown in FIG. 3b. The contact hole is located below the place where the gate line of the TFT is formed as illustrated in FIG. 2a and FIG. 3b. A second metal layer 10 is then formed on top of the first insulating layer as the gate line. The contact hole is also filled by the second metal layer 10. The second metal layer is patterned and etched appropriately to cover the contact hole and to form the gate metal for the thin film transistor. It should be noted that each black matrix is connected to the gate line of the next thin-film transistor by means of the contact hole as shown in FIG. 2a and FIG. 3b.

The remaining process of forming the thin-film transistor can be completed as customary. A gate insulating layer 11 of silicon nitride is deposited on the device to cover the gate metal and the first insulating layer. A layer of amorphous silicon (a-Si) 12 and a layer of n+-type amorphous silicon 13 are deposited on top of the gate insulating layer. Both the a-Si layer and the n+-type a-Si layer are patterned and etched. An ITO pixel electrode 14 is then formed above the gate insulating layer 11. The next step comprises the formation of a contact hole for connecting the metal gate line to the peripheral circuit of the LCD device that is not shown in FIG. 3. A third metal layer 16 is then deposited and patterned on the surface to form the source and drain metal. Finally, the n+-type a-Si layer is etched.

Figure 4A:
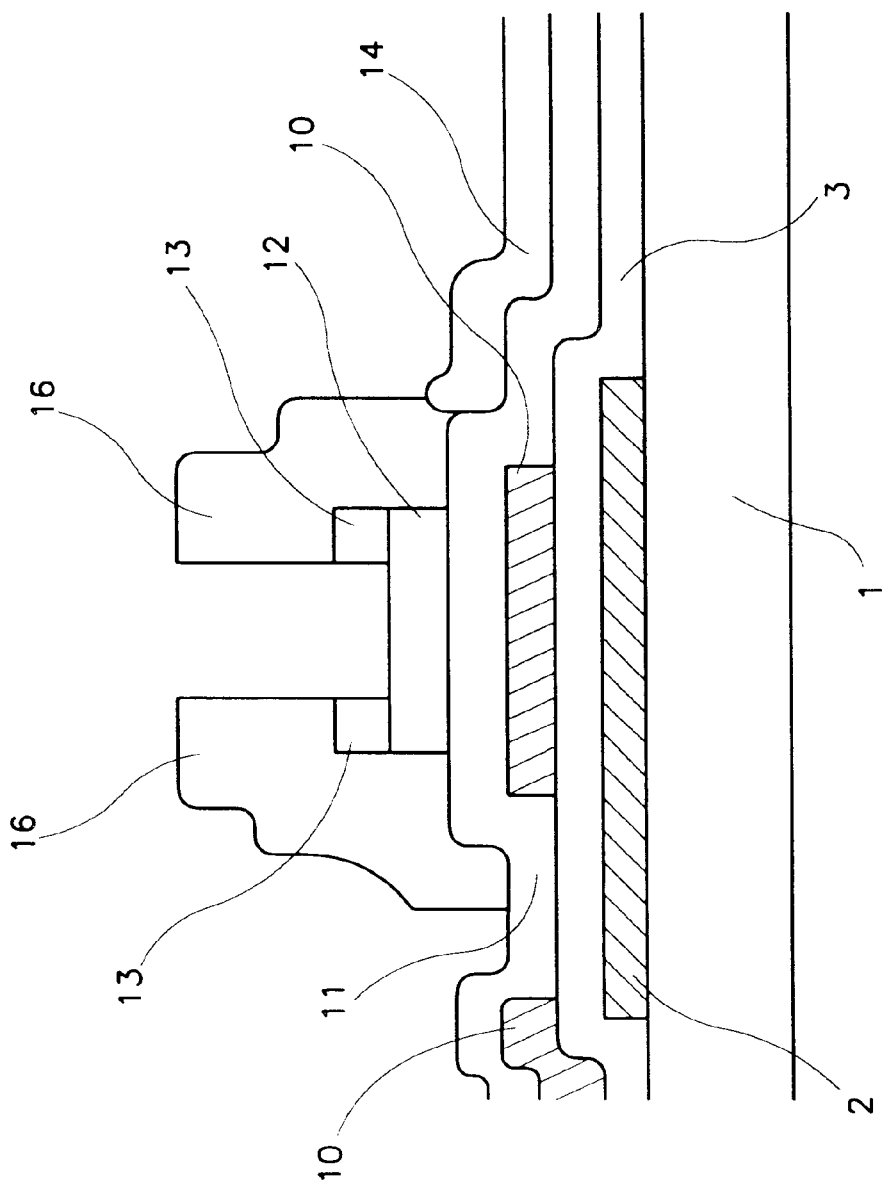
FIG. 4 shows cross-sectional views of- FIG. 2b comprising a back-channel-etching type inverted staggered TFT.

Similarly, FIG. 4 shows the cross sectional views along lines A-B and A-C of FIG. 2b. Although the black matrix pattern is slightly different from that shown in FIG. 2a and FIG. 3, the principle of operation and the process of manufacturing the thin-film transistor are identical. FIG. 4a shows a cross sectional view of the present invention along the line A-B of FIG. 2b. The thin-film transistor shown in FIG. 4a is a back-channel-etching (BCE) type inverted staggered TFT. FIG. 4b shows the cross sectional view along the line A-C of FIG. 2b. As can be seen in FIG. 4a, the black matrix pattern covers a large area above which the thin-film transistor is fabricated. The first insulating layer 3 is patterned and etched to form a contact hole 4 for contacting the black matrix as shown in FIG. 4b. The contact hole is located below the place where the gate line of the TFT is formed as illustrated in FIG. 2b and FIG. 4b. A second metal layer 10 is then formed, patterned and etched appropriately as the gate line to cover the contact hole on top of the first insulating layer. The contact hole is also filled by the second metal layer 10. As described for FIG. 3 before, the black matrix of this invention should be connected to the gate line of the next thin-film transistor by means of the contact hole as shown in FIG. 2b and FIG. 4b.

The following process of forming a gate insulating layer 11 of silicon nitride, a layer of amorphous silicon (a-Si) 12, a layer of n+-type amorphous silicon 13, and an ITO pixel electrode 14 is completed as customary. The next step comprises the formation of a contact hole for connecting the metal gate line to the peripheral circuit of the LCD device that is not shown in FIG. 4. Finally, a third metal layer 16 is deposited and patterned to form the source and drain metal, and the n+-type a-Si layer is etched.

According to this invention, each black matrix is connected to the gate line of its next TFT as shown in FIG. 2a. When the TFT-LCD device is in operation, only the selected gate line is driven. The rest of the gate lines are connected to the common electrode. A storage capacitor is formed by the pixel selected and the black matrix or the gate line under the pixel. A structure of storage-capacitor-on-gate is thus formed for the TFT. It should be noted that the driving method for a storage-capacitor-on-gate structure has to be adopted for the LCD device of this invention. The storage capacitor increases the total capacitance for the LCD device. Therefore, the decay of the display signal is decreased.

The aperture area of an LCD device is the total area excluding both the black matrixes and the gate lines that mask the light source during the LCD operation. The black matrix is fabricated below the TFT in the present invention, the aperture ratio is increased because no black matrix needs to be formed on the color filter plate. Although sometimes a light shield may still be formed on the color filter plate to reduce the light effect to the a-Si layer, the size of the light shield is typically much smaller than the total size of the black matrix and the gate line. The aperture ratio will not be reduced due to the light shield. The gate resistance is also reduced due to the connection to the black matrix. Therefore, a double layer gate commonly used for reducing the resistance is not required. The possibility of short between the gate and the common line is minimized because they are in different layers. The invention also decreases the flicker of the display.

Figure 5:
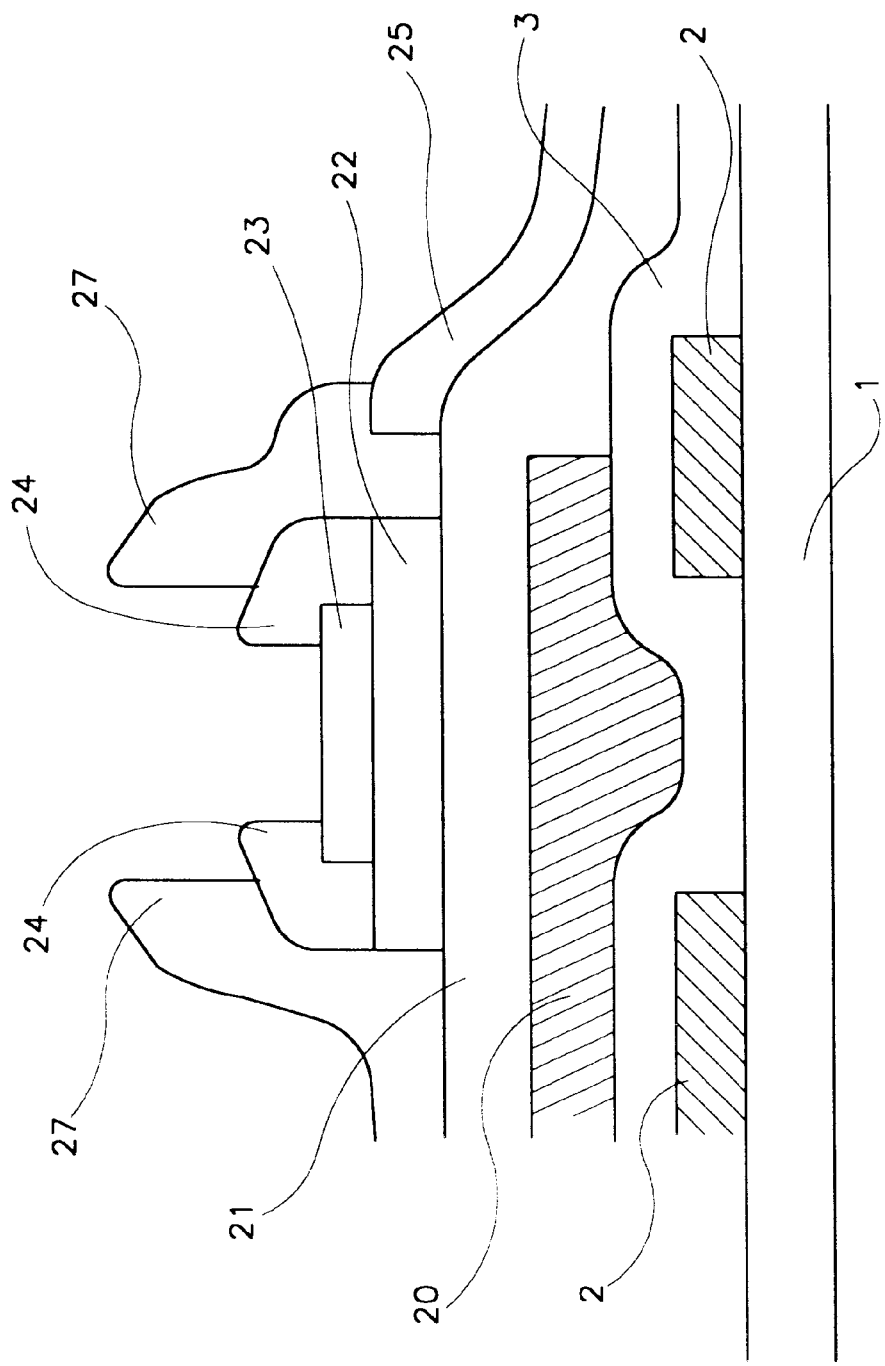
FIG. 5 shows a cross-sectional view of an etching-stop type inverted staggered TFT used in the present invention.

The thin-film transistor can also be an etching-stop type inverted staggered TFT as shown in FIG. 5. Similar to the process described for the embodiment shown in FIG. 3, the first insulating layer 3 is patterned and etched using conventional techniques to form a contact hole 4 for contacting the black matrix before fabricating the thin-film transistor. The second metal layer 20 is formed on top of the first insulating layer, patterned, and etched to form the gate metal that is connected to the black matrix through the contact hole.

A conventional method of fabricating the etching-stop type inverted staggered TFT can be used to complete the TFT. A gate insulating layer 21, an a-Si layer 22 and a SiNx layer 23 are formed above the gate metal layer and the first insulating layer. The SiNx layer 23 is patterned and etched. After etching, the remaining SiNx covers an area above the gate metal 20. A layer of n+-type a-Si 24 is then formed on top of the remaining SiNx 23 and the a-Si layer 22. Both n+-type a-Si 24 and a-Si 22 layers are patterned and etched. An ITO pixel electrode 25 is then formed on the open area above the gate insulating layer. Contact hole for connecting the gate line to the peripheral circuit is formed. The third metal layer 27 is then deposited and patterned on the surface to form the source and drain metal.

Figure 6:
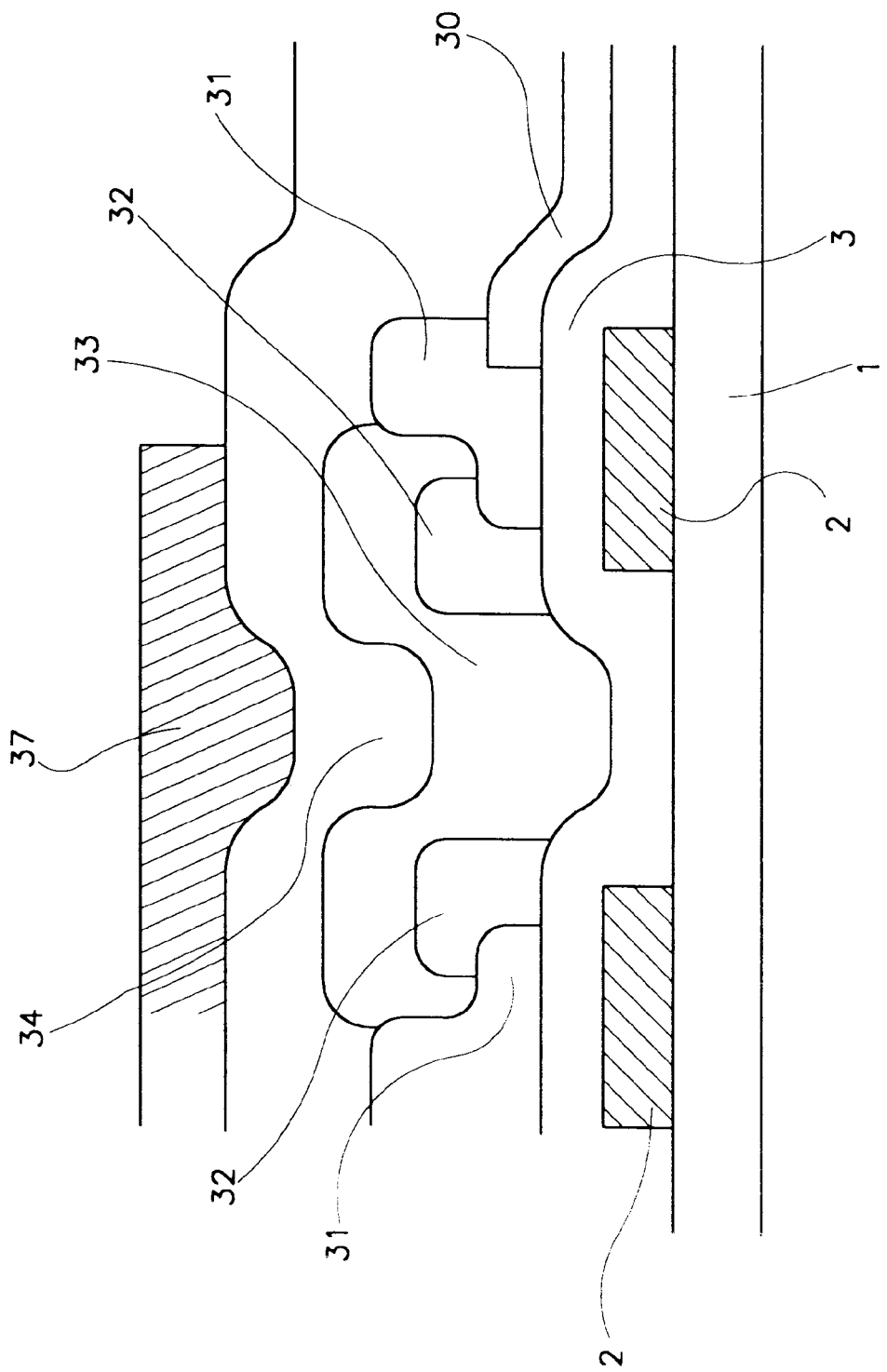
FIG. 6 shows a cross-sectional view of a staggered TFT used in the present invention.

FIG. 6 shows the cross sectional view of an alternative embodiment of this invention. The thin-film transistor of this embodiment is a staggered TFT. In this embodiment, A conventional process can be used to fabricate the first several layers for the TFT. An ITO pixel electrode 30 is first formed on top of the first insulating layer 3 of the present invention. A source/drain metal layer 31 is deposited, patterned and etched. A n+-type a-Si layer 32, an a-Si layer 33, and a gate insulating layer 34 are appropriately formed as in the conventional process for manufacturing a staggered TFT. A contact hole is then fabricated for connecting the data line to the peripheral circuit of the LCD device. In the present invention, an additional contact hole is also fabricated at the same time for contacting and connecting to the black matrix. Finally, a gate metal layer 37 is deposited and patterned as shown in FIG. 6.

Although only the preferred embodiments of this invention were shown and described in the above description, it is requested that any modification or combination that comes within the spirit of this invention be protected.

What is claimed is:

1. An array of inverted thin-film transistors and black matrixes for a liquid crystal display comprising:
    a glass substrate;
    a metal layer deposited on said glass substrate, said metal layer being patterned and etched to form an array of black matrixes, each of said black matrix being separated from its adjacent black matrix by a space;
    an insulating layer formed above the surface of said array of black matrixes and said glass substrate, said insulating layer being patterned and etched to form an array of contact holes for contacting said array of black matrixes;
    and an array of inverted thin-film transistors fabricated on the surface of said insulating layer, each transistor of said array of transistors controlling an ITO pixel electrode and having a bottom gate line formed above the space between two black matrixes, both black matrixes having a part below and overlapping the gate line, one of the two black matrixes being connected to the gate line through one of said contact hole array, and the other of the two black matrixes serving as a light shield element for the ITO pixel electrode.

2. The array of inverted thin-film transistors and black matrixes for a liquid crystal display according to claim 1, wherein said thin-film transistors are back-channel-etching type inverted staggered thin-film transistors.

3. The array of inverted thin-film transistors and black matrixes for a liquid crystal display according to claim 1, wherein said thin-film transistors are etching-stop type inverted staggered thin-film transistors.

4. The array of inverted thin-film transistors and black matrixes for a liquid crystal display according to claim 1, wherein said thin-film transistors are inverted coplanar thin-film transistors.

5. An array of thin-film transistors and black matrixes for a liquid crystal display comprising:
    a glass substrate;
    a metal layer deposited on said glass substrate, said metal layer being patterned and etched to form an array of black matrixes, each of said black matrix being separated from its adjacent black matrix by a space;
    an insulating layer formed above the surface of said array of black matrixes and said glass substrate;
    and an array of thin-film transistors fabricated on the surface of said insulating layer, each transistor of said array of transistors controlling an ITO pixel electrode and having a top gate line formed on top of said insulating layer above the space between two black matrixes, both black matrixes having a part below and overlapping the top gate line, one of the two black matrixes being connected to the top gate line through a contact hole fabricated through said insulating layer, and the other of the two black matrixes serving as a light shield element for the ITO pixel electrode.

6. The array of thin-film transistors and black matrixes for a liquid crystal display according to claim 5, wherein said thin-film transistors are staggered thin-film transistors.

7. The array of thin-film transistors and black matrixes for a liquid crystal display according to claim 5, wherein said thin-film transistors are coplanar thin-film transistors.

* * * * *